US008824435B2

(12) United States Patent
Seok et al.

(10) Patent No.: US 8,824,435 B2
(45) Date of Patent: Sep. 2, 2014

(54) METHOD OF CHANNEL SCANNING IN WIRELESS LOCAL AREA NETWORK SYSTEM

(75) Inventors: Yong Ho Seok, Gyeongki-do (KR); Eun Sun Kim, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/993,409

(22) PCT Filed: Oct. 21, 2009

(86) PCT No.: PCT/KR2009/006103
§ 371 (c)(1),
(2), (4) Date: Nov. 18, 2010

(87) PCT Pub. No.: WO2011/030956
PCT Pub. Date: Mar. 17, 2011

(65) Prior Publication Data
US 2011/0090890 A1    Apr. 21, 2011

Related U.S. Application Data

(60) Provisional application No. 61/240,664, filed on Sep. 9, 2009.

(51) Int. Cl.
*H04W 4/00* (2009.01)
*H04W 72/02* (2009.01)
*H04W 72/04* (2009.01)
*H04W 72/08* (2009.01)
*H04W 36/30* (2009.01)
*H04L 5/00* (2006.01)

(52) U.S. Cl.
CPC .......... *H04W 72/02* (2013.01); *H04W 72/0453* (2013.01); *H04W 72/085* (2013.01); *H04W 36/30* (2013.01); *H04L 5/0032* (2013.01); *H04L 5/0066* (2013.01)
USPC .......... 370/338; 370/328; 370/329; 370/331; 370/332; 370/333; 370/337; 455/434

(58) Field of Classification Search
None
See application file for complete search history.

(56) References Cited

U.S. PATENT DOCUMENTS 5,276,908 A    1/1994    Koohgoli et al.
5,774,805 A    6/1998    Zicker
(Continued)

FOREIGN PATENT DOCUMENTS

| CN | 1221542 A | 6/1999 |
|---|---|---|
| CN | 1745528 A | 3/2006 |

(Continued)

OTHER PUBLICATIONS

International Search Report from counterpart PCT application mailed Sep. 30, 2010.

(Continued)

*Primary Examiner* — Ian M Moore
*Assistant Examiner* — Dung B Huynh
(74) *Attorney, Agent, or Firm* — Morgan, Lewis & Bockius LLP (57) ABSTRACT

A method and apparatus of scanning channels of a white space zone in a wireless local area network is provided. A response frame includes a white space map including information about whether each white space channel in the white space zone is occupied by an incumbent user. Channels of the white space zone are scanned based on the white space map.

9 Claims, 5 Drawing Sheets

(56) References Cited

U.S. PATENT DOCUMENTS

| | | | |
|---|---|---|---|
| 6,175,739 B1* | 1/2001 | Ishii et al. | 455/452.1 |
| 6,757,550 B1* | 6/2004 | Yoneyama et al. | 455/525 |
| 6,826,400 B1* | 11/2004 | Cashman et al. | 455/434 |
| 6,882,841 B1* | 4/2005 | Youn | 455/434 |
| 7,280,834 B2* | 10/2007 | Takarabe | 455/450 |
| 7,606,193 B2 | 10/2009 | McFarland et al. | |
| 7,742,764 B2* | 6/2010 | Gillig et al. | 455/434 |
| 7,917,110 B2* | 3/2011 | Horiguchi et al. | 455/164.1 |
| 8,032,086 B2* | 10/2011 | Waltho et al. | 455/63.1 |
| 8,483,155 B1* | 7/2013 | Banerjea et al. | 370/329 |
| 8,583,129 B2 | 11/2013 | Kim et al. | |
| 8,588,158 B2 | 11/2013 | Kim et al. | |
| 8,588,160 B2 | 11/2013 | Kim et al. | |
| 8,605,741 B2 | 12/2013 | Kim et al. | |
| 2002/0154653 A1 | 10/2002 | Benveniste | |
| 2003/0050012 A1 | 3/2003 | Black et al. | |
| 2003/0093526 A1 | 5/2003 | Nandagopalan et al. | |
| 2005/0003827 A1 | 1/2005 | Whelan | |
| 2005/0063334 A1 | 3/2005 | Fnu et al. | |
| 2005/0070279 A1 | 3/2005 | Ginzburg et al. | |
| 2005/0169292 A1 | 8/2005 | Young | |
| 2006/0034236 A1 | 2/2006 | Jeong et al. | |
| 2006/0062183 A1* | 3/2006 | Forte et al. | 370/331 |
| 2006/0067354 A1* | 3/2006 | Waltho et al. | 370/433 |
| 2006/0089964 A1* | 4/2006 | Pandey et al. | 709/203 |
| 2006/0218392 A1* | 9/2006 | Johnston | 713/156 |
| 2007/0014267 A1* | 1/2007 | Lam et al. | 370/338 |
| 2007/0047492 A1 | 3/2007 | Kim et al. | |
| 2007/0192472 A1* | 8/2007 | Tokunaga et al. | 709/223 |
| 2007/0253394 A1* | 11/2007 | Horiguchi et al. | 370/338 |
| 2008/0130519 A1 | 6/2008 | Bahl et al. | |
| 2008/0151796 A1 | 6/2008 | Jokela | |
| 2008/0171552 A1* | 7/2008 | Hyon et al. | 455/450 |
| 2008/0240024 A1 | 10/2008 | Rao et al. | |
| 2008/0268832 A1 | 10/2008 | Peng | |
| 2008/0298333 A1 | 12/2008 | Seok | |
| 2009/0061783 A1 | 3/2009 | Choi et al. | |
| 2009/0111463 A1 | 4/2009 | Simms et al. | |
| 2009/0158282 A1* | 6/2009 | Blaisdell et al. | 718/102 |
| 2009/0171930 A1* | 7/2009 | Vaughan et al. | 707/5 |
| 2009/0191906 A1* | 7/2009 | Abedi | 455/501 |
| 2009/0196180 A1* | 8/2009 | Bahl et al. | 370/235 |
| 2009/0197627 A1 | 8/2009 | Kuffner et al. | |
| 2009/0207800 A1* | 8/2009 | Shan et al. | 370/329 |
| 2009/0217333 A1* | 8/2009 | Young et al. | 725/109 |
| 2009/0268674 A1* | 10/2009 | Liu et al. | 370/329 |
| 2009/0280748 A1 | 11/2009 | Shan et al. | |
| 2009/0298522 A1* | 12/2009 | Chaudhri et al. | 455/509 |
| 2009/0323835 A1* | 12/2009 | Rao et al. | 375/260 |
| 2009/0325499 A1* | 12/2009 | Corke et al. | 455/67.11 |
| 2010/0008285 A1* | 1/2010 | Kuroda | 370/315 |
| 2010/0030907 A1 | 2/2010 | Pollak | |
| 2010/0034160 A1* | 2/2010 | Prakash et al. | 370/329 |
| 2010/0048234 A1* | 2/2010 | Singh | 455/509 |
| 2010/0061299 A1* | 3/2010 | Kennedy et al. | 370/328 |
| 2010/0069013 A1* | 3/2010 | Chaudhri et al. | 455/67.11 |
| 2010/0081449 A1 | 4/2010 | Chaudhri et al. | |
| 2010/0091712 A1* | 4/2010 | Lu et al. | 370/328 |
| 2010/0111235 A1* | 5/2010 | Zeng et al. | 375/343 |
| 2010/0124254 A1* | 5/2010 | Wu et al. | 375/131 |
| 2010/0142458 A1* | 6/2010 | Mark | 370/329 |
| 2010/0175101 A1* | 7/2010 | Devictor et al. | 725/131 |
| 2010/0177756 A1* | 7/2010 | Choi et al. | 370/338 |
| 2010/0195580 A1* | 8/2010 | Samarasooriya et al. | 370/329 |
| 2010/0195590 A1* | 8/2010 | Park | 370/329 |
| 2010/0195595 A1 | 8/2010 | Iwata | |
| 2010/0195667 A1* | 8/2010 | Wang et al. | 370/466 |
| 2010/0220687 A1* | 9/2010 | Reznik et al. | 370/331 |
| 2010/0229205 A1* | 9/2010 | Hakusui | 725/62 |
| 2010/0232372 A1* | 9/2010 | Jakllari et al. | 370/329 |
| 2010/0246434 A1* | 9/2010 | Wang et al. | 370/253 |
| 2010/0246506 A1* | 9/2010 | Krishnaswamy | 370/329 |
| 2010/0303026 A1* | 12/2010 | Chaudhri et al. | 370/329 |
| 2010/0309317 A1* | 12/2010 | Wu et al. | 348/180 |
| 2010/0309806 A1* | 12/2010 | Wu et al. | 370/252 |
| 2011/0019649 A1 | 1/2011 | Dayal et al. | |
| 2011/0043710 A1* | 2/2011 | Samarasooriya et al. | 348/735 |
| 2011/0045781 A1 | 2/2011 | Shellhammer et al. | |
| 2011/0090887 A1 | 4/2011 | Kim et al. | |
| 2011/0090890 A1 | 4/2011 | Seok et al. | |
| 2011/0091393 A1 | 4/2011 | Simmonds et al. | |
| 2011/0116458 A1 | 5/2011 | Hsu et al. | |
| 2011/0122855 A1 | 5/2011 | Henry | |
| 2011/0164581 A1* | 7/2011 | Keon | 370/329 |
| 2011/0222488 A1 | 9/2011 | Kim et al. | |
| 2011/0243078 A1 | 10/2011 | Kim et al. | |
| 2011/0286405 A1 | 11/2011 | Kim et al. | |
| 2012/0063364 A1 | 3/2012 | Emmelmann et al. | |
| 2012/0096492 A1* | 4/2012 | Urban et al. | 725/39 |
| 2012/0096498 A1 | 4/2012 | Wu et al. | |
| 2012/0120904 A1 | 5/2012 | Seok et al. | |
| 2012/0165056 A1 | 6/2012 | Kim et al. | |
| 2012/0170534 A1 | 7/2012 | Kim et al. | |
| 2012/0208558 A1 | 8/2012 | Bajko et al. | |
| 2012/0218956 A1 | 8/2012 | Kim et al. | |
| 2012/0315855 A1* | 12/2012 | Li et al. | 455/67.7 |
| 2013/0114586 A1 | 5/2013 | Kim et al. | |
| 2013/0142132 A1 | 6/2013 | Kim et al. | |
| 2014/0113649 A1 | 4/2014 | Bajko et al. | |

FOREIGN PATENT DOCUMENTS

| | | |
|---|---|---|
| CN | 101006683 A | 7/2007 |
| CN | 101242333 A | 8/2008 |
| JP | 2007-184850 A | 7/2007 |
| JP | 2007300419 A | 11/2007 |
| KR | 10-2009-0021865 A | 3/2009 |
| WO | WO 2006/117587 | 11/2006 |
| WO | WO 2009/016800 | 2/2009 |
| WO | 2009/031825 A2 | 3/2009 |
| WO | 2009/061779 A1 | 5/2009 |
| WO | 2009/069068 A2 | 6/2009 |

OTHER PUBLICATIONS

Han, J.A., et al., Introduction to Cognitive Radio Network, KIISE Information Review, vol. 22, No. 2, Nov. 2008, pp. 1-16.

Mangold, S., et al., Spectrum Agile Radio: Radio Resource Measurements for Opportunistic Spectrum Usage, IEEE, Global Telecommunications Conference 2004, Globecom 2004, vol. 6, Nov. 29, 2004, pp. 3467-3471.

Cordeiro, C., et al., IEEE 802.22: An Introduction to the first Wireless Standard based on Cognitive Radios, IEEE Journal of Communications, vol. 1, No. 1, Apr. 2006, pp. 38-47.

Challapali, K., et al., Spectrum Agile Radio: Detecting Spectrum Opportunities, NTIA Special Publication SP-04-409, Proceedings of the International Sumposium on Advanced Radio Technologies Mar. 2-4, 2004, pp. 1-12.

Srivastava et al. "Expanding Wireless Communication with 'White Space,'" White Paper of Dell Inc., Oct. 2008.

Stevenson et al. "IEEE 802.22: The First Cognitive Radio Wireless Regional Area Network Standard," IEEE Communications Magazine, Jan. 2009, pp. 130-138.

Sturza et al. "White Spaces Engineering Study: can cognitive radio technology operating in the TV white spaces completely protect licensed TN broadcasting?" New America Foundation Wireless Future Program, working paper No. 16, Jan. 2007.

Bahl et al. "White Space Networking with Wi-Fi like Connectivity," ACM SIGCOMM 2009, Aug. 17, 2009.

Pagadarai et al. "Wireless Spectrum Characterisation and Dynamic Utilization in Vehicular Communication Networks," Final Report, Wireless Innovation Laboratory, Worcester Polytechnic Institute, Sep. 30, 2009.

Wei et al. "Two-Hop-Relay Architecture for Next-Generation WWAN/WLAN Integration," IEEE Wireless Communications, Apr. 2004, pp. 2-9.

Singh et al. "PAMAS-Power Aware Multi-Access Protocol with Signalling for Ad Hoc Networks," Computer Communication Review, vol. 28, Issue 3, Jul. 1998, pp. 5-26.

Juha Ala Laurila et al. "Wireless LAN Access Network Architecture for Mobile Operators," Computer Communication Review, IEEE (56) References Cited

OTHER PUBLICATIONS

Communications Magazine, Nov. 2001, pp. 82-89.
Cordeiro, et al., "An Introduction to the First Wireless Standard based on Cognitive Radios," IEEE Journal of Communications, vol. No. 1, Apr. 2006, pp. 38-47.
PCT International Search Report in Application No. PCT/KR2010/007076 dated Jun. 24, 2011.
PCT International Search Report in Application No. PCT/KR2011/001885 dated Oct. 26, 2011.
PCT International Search Report in Application No. PCT/KR2011/002276 dated Dec. 28, 2011.
PCT International Search Report in Application No. PCT/KR2010/06955 dated Jun. 24, 2011.
PCT International Search Report in Application No. PCT/KR2010/008976 dated Aug. 22, 2011.
PCT International Search Report in Application No. PCT/KR2010/006954 dated Jun. 24, 2011.
PCT International Search Report in Application No. PCT/KR2010/007011 dated Jun. 21, 2011.
USPTO Office Action dated Aug. 7, 2013 in related technology U.S. Appl. No. 13/384,844.
USPTO Notice of Allowability dated Jul. 12, 2013 in related technology U.S. Appl. No. 12/910,186.
USPTO Notice of Allowability dated Jul. 17, 2013 in related technology U.S. Appl. No. 13/051,562.
Nan Hao, et al., Short-Range WLAN Compatible Hybrid Cognitive Radio Networks System and MAC Protocol, Communication Software and Networks, 2009, ICCSN 2009 International Conference on Communication Software and Networks, IEEE, Feb. 28, 2009, pp. 81-86.
USPTO Office Action dated Feb. 12, 2013 in related technology U.S. Appl. No. 13/030,654.
Office Action dated Dec. 7, 2012 in related technology U.S. Appl. No. 13/046,048.
Office Action dated Dec. 6, 2012 in related technology U.S. Appl. No. 12/910,186.
Notice of Allowance dated Dec. 10, 2012 in related technology U.S. Appl. No. 13/096,289.
USPTO Office Action dated Sep. 5, 2013 in related technology U.S. Appl. No. 12/908,449.
Office Action dated Feb. 3, 2014 from the Canadian Intellectual Property Office in counterpart Canadian application 2,773,660.
Nekovee, Maziar, "A Survey of Cognitive Radio Access to TV White Spaces," Ultra Modern Telecommunications & Workshops, ICUMT'09, International Conference on, Oct. 12, 2009, pp. 1-8.
Office Action dated Mar. 7, 2014, issued by the U.S. Patent & Trademark Office in U.S. Appl. No. 12/908,449.
First Notification of Office Action dated Dec. 23, 2013 from The State Intellectual Property Office of China in counterpart Chinese application 200980161376.8.
USPTO Office Action dated Jan. 16, 2014 in related technology U.S. Appl. No. 14/074,276.
Ha Nguyen Tran, et al., Requirements and Amendment Regarding TVWS Database Access, IEEE 802.11-10/0262r1, IEEE mentor, Mar. 17, 2010, pp. 2-12.
Necati Canpolat, et al., TGu Single GAS Protocol, IEEE 802.11-10/0266r9, IEEE mentor, Mar. 18, 2010, pp. 2-57.
Eunsun Kim, et al., Normative Text for Scanning in TV Whitespaces, IEEE 802.11-10/0472r2, IEEE mentor, May 11, 2010, pp. 2-13.
Office Action dated Apr. 1, 2014, issued by the State Intellectual Property Office of China in Chinese Patent Application No. 201080058187.0.
Office Action dated Jun. 25, 2014, issued by the U.S. Patent and Trademark Office in U.S. Appl. No. 12/908,449.
Office Action dated Jun. 27, 2014, issued by the State Intellectual Property Office of China in Chinese Patent Application No. 201080065876.4.
Office Action dated May 23, 2014, issued by the U.S. Patent & Trademark Office in U.S. Appl. No. 14/074,276.

* cited by examiner

METHOD OF CHANNEL SCANNING IN WIRELESS LOCAL AREA NETWORK SYSTEM

RELATED APPLICATIONS

The present application is a U.S. National Phase Application of International Application No. PCT/KR2009/006103 (filed Oct. 21, 2009) which claims priority to U.S. Provisional Application No. 61/240,664 (filed Sep. 9, 2009).

TECHNICAL FIELD

The present invention relates to a wireless local area network (WLAN), and more particularly, to a method of channel scanning, when a WLAN system is applied in an environment where it can coexist with another wireless communication system.

BACKGROUND ART

There are frequency bands in which different kinds of wireless communication systems can coexist. One example of the frequency bands is a TV white space. The TV white space is an idle frequency band reserved due to digitalization of an analog broadcasting. The TV white space is a spectrum of 512 to 698 MHz allocated to a broadcast TV. When a licensed device is not used in the corresponding spectrum, an unlicensed device can use the corresponding band.

When IEEE 802.11 is used in the TV white space, there is an advantage in that the coverage is remarkably expanded due to the spectrum's characteristic. However, generally, as the coverage is expanded, the number of stations considerably increases. In this situation, a problem may arise in a capability of flexibly handling users with increase of the number of the users, i.e. scalability. Moreover, since several wireless communication systems coexist and several unlicensed devices coexist, a problem may arise in coexistence. If a Distributed Coordination Function (DCF) and an Enhanced Distributed Channel Access (EDCA) protocol of IEEE 802.11 are applied in this environment, scalability may be more deteriorated.

The DCF is a channel access mechanism used in IEEE 802.11 and is based on Carrier Sense Multiple Access/Collision Avoidance (CSMA/CA). Also, the EDCA is equivalent to a competition-based medium access method among channel access models suggested by a Hybrid Coordination Function (HCF) defined by expanding a general medium access control protocol of IEEE 802.11. Here, the HCF is a protocol defined in IEEE 802.11e suggested to ensure Quality of Service (QoS).

Further, when the protocol of IEEE 802.11 is applied in the TV white space, it is expected that overlapping Basic Service Sets (BSSs) will increase sharply. For example, if a user arbitrarily installs an Access Point (AP) supporting the TV white space, since the coverage of the AP is wide, an overlapping service area may increase.

When the unlicensed device intends to use the TV white space, it should acquire an available channel in a corresponding area, using a geo-location database. In addition, a signaling protocol or a spectrum sensing mechanism is necessary to solve a problem in coexistence of the unlicensed devices using the TV white space.

DISCLOSURE OF INVENTION

Technical Problem

The present invention provides a channel scanning mechanism capable of guaranteeing coexistence of unlicensed devices using a white space.

The present invention also provides a channel scanning mechanism capable of reducing overhead with respect to spectrum sensing generated during a scanning process when a large number of channels are scanned.

The present invention also provides a method for exchanging channel information between an access point (AP) and a station (STA) to thus reduce power consumption of the station yet without degrading detection probability with respect to an incumbent user.

Solution to Problem

In an aspect, a method of scanning channels for a whitespace zone in a wireless local area network is provided. The method includes transmitting a request frame from a scanning station to a response station, and receiving a response frame as a response of the request frame from the response station, wherein the response frame includes a white space map including information about whether each white space channel in the white space zone is occupied by an incumbent user, and scanning channels of the whitespace zone based on white space map.

The request frame may be transmitted to the response station on the unoccupied channel.

The request frame may include a scanning result of the channels of the whitespace zone.

The white space map may include a sensing channel number and a sensing report, the sensing report indicating a sensing result for a white space channel corresponding to the sensing channel number.

The sensing report may include a primary user bit indicating whether or not there is an incumbent user in the white space channel corresponding to the sensing channel number.

The sensing report may further include a unknown user bit indicating whether or not there is an unknown user in the a white space channel corresponding to the sensing channel number.

The white space map may further include a sensing time including information about a time period during which sensing has been performed.

The white space map may be included in a frame body of the request frame.

The request frame may be a probe request frame, and the response frame may be a probe response frame.

The request frame may be a WSM request frame, and the response frame may be a WSM response frame.

The step of scanning channels of the whitespace zone may include determining a unoccupied channel based on the white space map, and scanning the unoccupied channel.

In another aspect, a wireless apparatus is provided. The wireless apparatus includes a transceiver configured to receive a response frame, the response frame including a white space map including information about whether each white space channel in the white space zone is occupied by an incumbent user, and a processor configured to scan channels of the white space zone based on the white space map.

Advantageous Effects of Invention

In a white space zone, a scanning station can scan only unoccupied channels. Channel scanning may be performed faster and power consumption due to channel scanning may be reduced.

MODE FOR THE INVENTION

A management procedure in a wireless communication system and a device supporting the management procedure according to exemplary embodiments of the present invention will now be described with reference to the accompanying drawings. In the following description of the exemplary embodiments of the present invention, a wireless local area network (WLAN) system operating in a white space, among wireless communication systems, will be taken as an example, but it is merely illustrative and the technical idea of the present invention is not meant to be limited thereto. Thus, the exemplary embodiments of the present invention described hereinafter can be also applied in the same manner to any other wireless communication systems that performs a process of scanning a plurality of channels than the WLAN system, except for the case not allowed in its properties. In this case, terms or words unique to the WLAN employed in the exemplary embodiments of the present invention may be properly altered to other terms or words commonly used in a corresponding wireless communication system.

Figure 1:
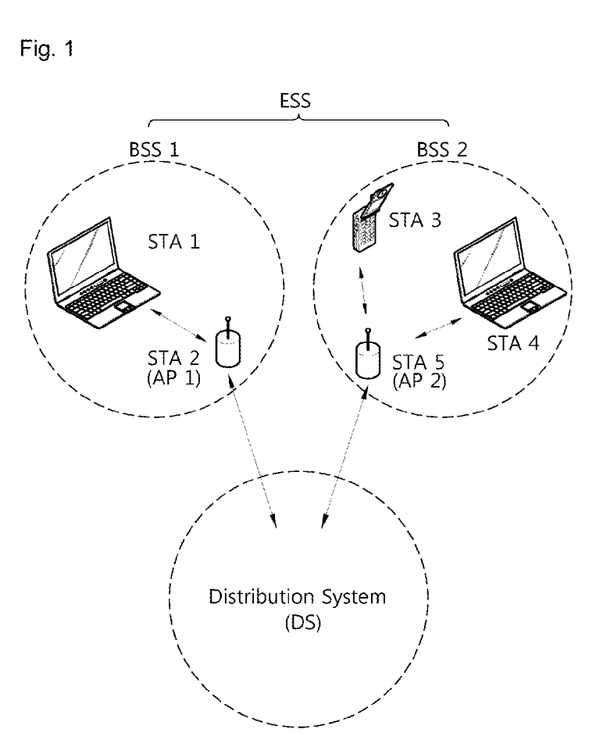
FIG. 1 illustrates the configuration of a wireless local area network (WLAN) according to an exemplary embodiment of the present invention.

FIG. 1 is a schematic view showing an exemplary structure of a WLAN system according to an embodiment of the present invention.

Referring to FIG. 1, a WLAN system such as the WLAN system includes one or more basis service sets (BSSs). The BSS is a set of stations (STAs) which are successfully synchronized to communicate with one another, and is not a concept indicating a specific region. The BSS can be classified into an infrastructure BSS and an independent BSS (IBSS). The infrastructure BSS is shown in FIG. 1. Infrastructure BSSs (i.e., BSS1 and BSS2) include one or more non-access point (AP) STAs (i.e., Non-AP STA1, Non-AP STA3, and Non-AP STA4), AP STAs (i.e., AP STA1 and AP STA2) which are STAs providing a distribution service, and a distribution system (DS) connecting the plurality of AP STAs (i.e., AP STA1 and AP STA2). In the infrastructure BSS, an AP STA manages non-AP STAs of the BSS.

On the other hand, the IBSS is a BSS operating in an ad-hoc mode. Since the IBSS does not include the AP, a centralized management entity for performing a management function in a centralized manner does not exist. That is, the IBSS manages the non-AP STAs in a distributed manner. In addition, in the IBSS, all STAs may consist of mobile STAs, and a self-contained network is configured since access to the DS is not allowed.

The STA is an arbitrary functional medium including a medium access control (MAC) and wireless-medium physical layer interface conforming to the institute of electrical and electronics engineers (IEEE) 802.11 standard, and includes both an AP and a non-AP STA in a broad sense. The STA for wireless communication includes a processor and a transceiver, and also includes a user interface, a display means, etc. The processor is a functional unit devised to generate a frame to be transmitted through a wireless network or to process a frame received through the wireless network, and performs various functions to control STAs. The transceiver is functionally connected to the processor and is a functional unit devised to transmit and receive a frame for the STAs through the wireless network.

Among the STAs, non-AP STAs (i.e., STA1, STA3, STA4, and STA5) are portable terminals operated by users. A non-AP STA may be simply referred to as an STA. The non-AP STA may also be referred to as a terminal, a wireless transmit/receive unit (WTRU), a user equipment (UE), a mobile station (MS), a mobile terminal, a mobile subscriber unit, etc. In the following description, a non-AP STA operating in a TV white space spectrum would be referred to as 'non-AP WS STA' or simply as 'WS STA'.

The AP (i.e., AP1 and AP2) is a functional entity for providing access to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. In the following description, a AP STA operating in a TV white space spectrum would be referred to as 'WS AP'.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical construction for interconnecting APs.

To access a network, an STA first performs a procedure of searching a network the STA can join. Before joining the wireless network, the STA must identify a compatible network, and the process of identifying a network present in a particular area is called scanning.

Table 1 below shows types of parameters that can be used for the scanning procedure and brief descriptions therefor.

Table 1

TABLE 1

| Name | Type | Valid range | Description |
| --- | --- | --- | --- |
| BSSType | Enumeration | INFRASTRUCTURE, INDEPENDENT, ANY_BSS | Determines whether infrastructure BSS, IBSS, or both, are included in the scan. |
| BSSID | MACAddress | Any valid individual or broadcast MAC address | Identifies a specific or wildcard BSSID. |
| SSID | Octet string | 0-32 octets | Specifies the desired SSID or the wildcard SSID. |
| ScanType | Enumeration | ACTIVE, PASSIVE | Indicates either active or passive scanning. |
| ProbeDelay | Integer | N/A | Delay (in microseconds) to be used prior to transmitting a Probe frame during active scanning. |
| ChannelList | Ordered set of integers | Each channel will be selected from the valid channel range for the appropriate PHY and carrier set. | Specifies a list of channels that are examined when scanning for a BSS. |
| MinChannelTime | Integer | ≥ProbeDelay | The minimum time (in TU) to spend on each channel when scanning. |
| MaxChannelTime | Integer | ≥MinChannelTime | The maximum time (in TU) to spend on each channel when scanning. |
| VendorSpecificInfo | A set of information elements | | Zero or more information elements. |

The STA scans a network that can be accessible according to the parameter values of Table 1, and in this case, the STA performs scanning in an active scanning scheme or a passive scanning scheme according to a ScanType parameter value in Table 1.

Figure 2:
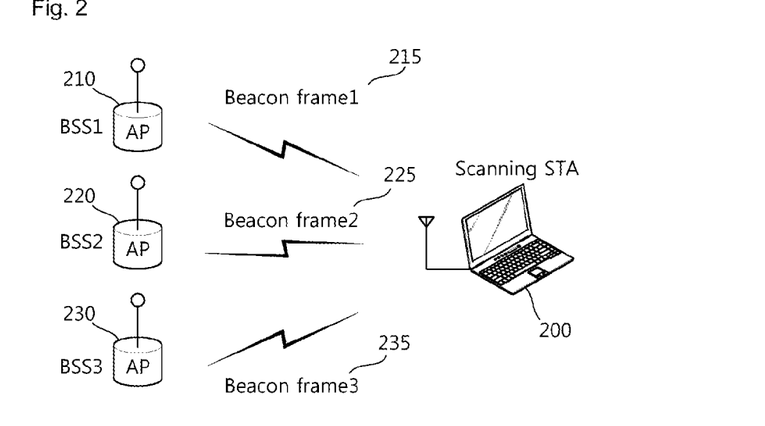
FIG. 2 is a view schematically showing a passive scanning scheme.

FIG. 2 schematically shows the passive scanning scheme. In the passive scanning scheme, the scanning STA waits for a beacon frame while moving each channel on a channel list. The channel list specifies a list of channels that are examined when scanning for a BSS. The beacon frame, one of management frames in IEEE 802.11, is periodically transmitted to inform about the presence of a wireless network, allow the scanning STA to search for the wireless network to join it. In an infrastructure network, an access point (AP) serves to periodically transmit the beacon frame.

When the scanning STA receives the beacon frame, it buffers the beacon frame to acquire information about a BSS, and records the beacon frame information in each channel while moving to the channels.

With reference to FIG. 2, a scanning STA 200 performs channel scanning in a particular channel according to the passive scanning scheme. If the scanning STA 200 receives a beacon frame 215 transmitted by an AP1 210 of a BSS1 and a beacon frame 225 transmitted by an AP2 220 of a BSS2, but not a beacon frame 235 transmitted by an AP3 230 of a BSS3, the scanning STA 200 performs buffering that the two BSSs (BSS1 and BSS2) have been discovered from a current channel and moves to another channel. Repeatedly performing this process, the scanning STA 200 performs scanning on every channel on a channel list.

Figure 3:
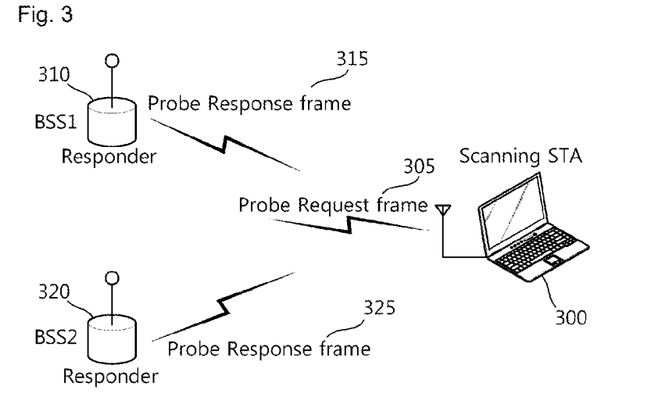
FIG. 3 is a view schematically showing an active scanning scheme.

FIG. 3 schematically shows the active scanning scheme. In the active scanning scheme, the scanning STA transmits a probe request frame, a management frame, transmitted to probe into an AP present nearby while moving each channel on the channel list, and waits for a pertinent response. In response to the probe request frame, a responder transmits a probe response frame to the scanning STA. Here, the responder refers to an STA which has finally transmitted a beacon frame in a BSS of a channel which was being scanned. In an infrastructure BSS, an AP transmits a beacon frame, so the AP is the responder, while in an IBSS, STAs within the IBSS transmits a beacon frame by turns, so a responder is not fixed.

With reference to FIG. 3. when a scanning STA 300 transmits a probe request frame 305, a first responder 310 of the BSS1 and a second responder 320 of the BSS2, which have listened to it, unicast a first probe response frame 315 and a second probe response frame 325 to the scanning STA 300, respectively. Upon receiving the first and second probe response frames 315 and 325, the scanning STA 30 buffers BSS-related information from the received probe response frames, moves to a next channel, and performs scanning on the next channel in the same manner.

Figure 4:
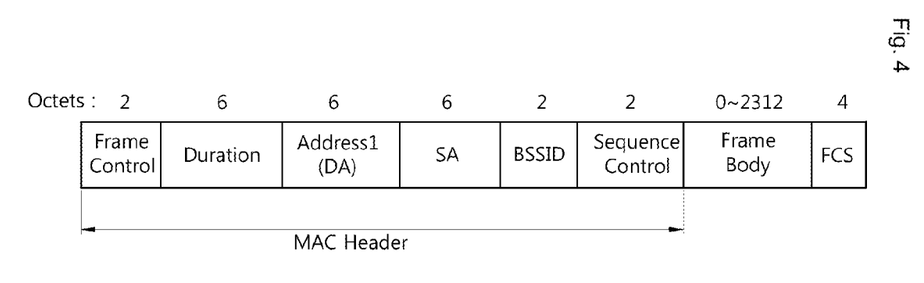
FIG. 4 illustrates a format of a management frame in IEEE 802.11 standard.

FIG. 4 illustrates a format of the management frame in IEEE 802.11 standard. With reference to FIG. 4, a management frame includes a MAC header, a frame body, and an FCS. Details of the fields and subfields of the management frame are described in "IEEE Std 802.11-2007 (Mar. 8, 2007) (Revision of IEEE Std 802.11-1999), IEEE Standard for Information Technology—Telecommunications and information exchange between systems—Local and metropolitan area networks—Specific requirements, Part 11: Wireless LAN Medium Access Control (MAC) and Physical Layer (PHY) Specifications", which is incorporated by reference herein.

A frame control field in the MAC header includes a Type subfield and a Subtype subfield. A management frame, a control frame, and a data frame are discriminated according to the Type subfield value. For example, for the management frame, 2-bit Type subfield is set to 00. When the Type subfield is set to 00, a probe response frame, a beacon frame, and the like, are discriminated according to a setting of the Subtype field.

The probe request frame is a management frame used for the STA to search for a nearby accessible network from a certain channel. For the probe request frame, the Type subfield of the frame control field is set to 00 and the Subtype subfield is set to 0100.

Table 2 below shows an example of information elements included in the probe request frame.

TABLE 2

| Order | Information | Notes |
| --- | --- | --- |
| 1 | SSID | |
| 2 | Supported rates | |
| 3 | Request information | May be included if dot11MultiDomainCapabilityEnabled is true. |
| 4 | Extended Supported Rates | The Extended Supported Rates element is present whenever there are more than eight supported rates, and it is optional otherwise. |
| Last | Vendor Specific | One or more vendor-specific information elements may appear in this frame. This information element follows all other information elements. |

With reference to Table 2, the probe request frame includes SSID, Supported rates, and may include information elements such as Request information, Extended Supported Rates, Vendor Specific. The SSID (Service Set ID) may be the name of a network having the length of 0 to 32 octets. In the probe request frame, the SSID may be set to an SSID of a particular network or may be set to a broadcast SSID (0 octet) to search for every network. The information element of Supported rates is a data transfer rate supported by the STA. The elements of SSID and Supported rates are used as a reference for determining whether it is compatible with a network.

The probe response frame is a management frame which is unicast to the scanning STA in response to the probe request frame in the IEEE 802.11 standard, to inform about the presence of a network. In the probe response frame, the Type subfield of the frame control field is set to 00 and Subtype subfield is set to 0101.

Table 3 below shows an example of information elements included in the probe response frame.

TABLE 3

| Order | Information | Notes |
| --- | --- | --- |
| 1 | Timestamp | |
| 2 | Beacon interval | |
| 3 | Capability | |
| 4 | SSID | |
| 5 | Supported rates | |
| 6 | FH Parameter Set | The FH Parameter Set information element is present within Probe Response frames generated by STAs using FH PHYs. |
| 7 | DS Parameter Set | The DS Parameter Set information element is present within Probe Response frames generated by STAs using Clause 15, Clause 18, and Clause 19 PHYs. |
| 8 | CF Parameter Set | The CF Parameter Set information element is present only within Probe Response frames generated by APs supporting a PCF. |
| 9 | IBSS Parameter Set | The IBSS Parameter Set information element is present only within Probe Response frames generated by STAs in an IBSS. |

With reference to Table 3, the probe response frame includes information elements such as Timestamp, Beacon interval, Capability, SSID, Supported rates, and the like. The information elements shown in Table 3 are merely illustrative, and the probe response frame may include additional information elements. The probe response frame transmits parameters of every beacon frame excluding a traffic indicator map (TIM). The TIM information element is an information element informing whether or not there is a buffered frame waiting to be transmitted. Because the STA that transmits the probe request frame is not associated yet, it does not need to know about the presence of the buffered frame waiting to be transmitted.

Figure 5:
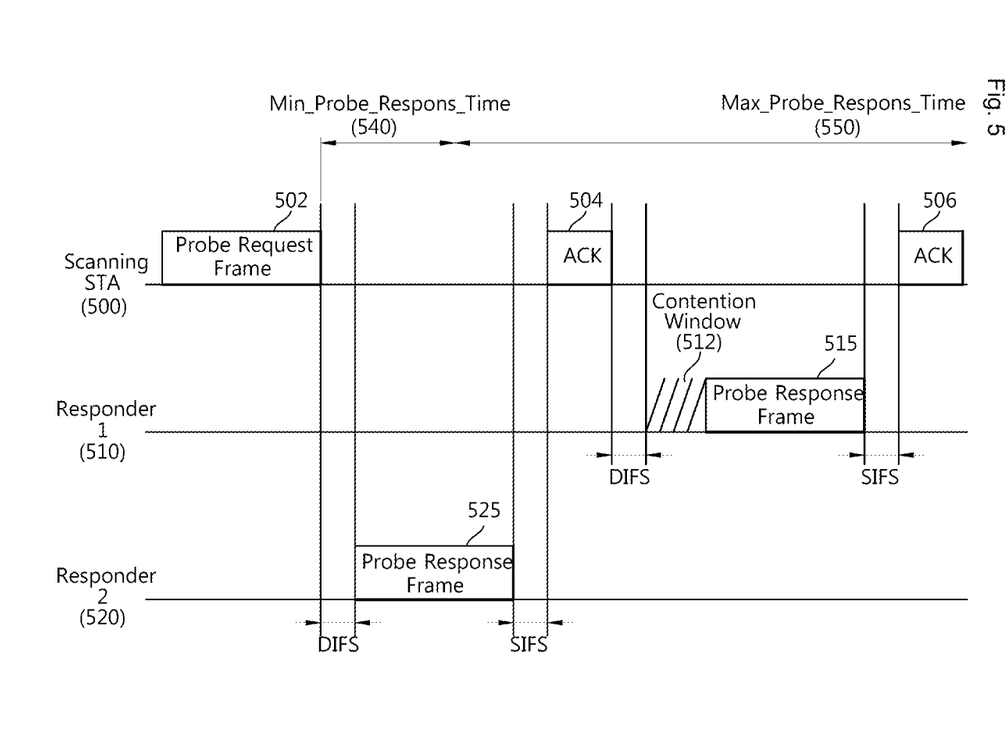
FIG. 5 is a view briefly showing an active scanning procedure.

FIG. 5 is a view briefly showing an active scanning procedure.

With reference to FIG. 5, a scanning STA 500 moves to a particular channel and then waits until a ProbeDelay timer expires. If there is an incoming frame before the ProbeDelay timer expires, the channel is ascertained to be in use, so the scanning station 500 performs a scanning procedure. The scanning STA 500 gets accessing a medium by using a basic DCF accessing procedure of IEEE 802.11 standard, and transmits a probe request frame 502.

In the example illustrated in FIG. 5, upon listening to the probe request frame 502 of the scanning STA 500, a responder 1 510 transmits a probe response frame 515 to the scanning STA 500 and a responder 2 520 transmits a probe response frame 525 to the scanning STA 500. Here, the responders 510 and 520 may be an AP of the infrastructure BSS or an STA which has transmitted a final beacon frame in the IBSS. The probe response frame 515 of the responder 1 510 is transmitted based on the DCF rule of IEEE 802.11 standard. Accordingly, the probe response frame 515 is transmitted through the process of a contention window 512.

In the example illustrated in FIG. 5, Min_Probe_Response_Time 540 is a minimum response time. If a first response is made before the minimum response time lapses, another response is awaited until when a maximum response time (Max_Probe_Response_Time) 550 expires. If there is no any other response until when the Max_Probe_Response_Time 550 expires, the scanning STA 500 determines that there are two BSSs in the channel.

In this respect, however, immediately application of the active scanning scheme as described above to the WS STA operating in the TV white space environment is not proper. This is because a WS AP and the WS STA operating in the TV white space should provide a protection function with respect to a licensed device, and in this case, the licensed device has priority over the use of a corresponding band. The licensed device is a user allowed to use the corresponding band, which may be called by other names such as licensed user, primary user, incumbent user, and the like. In the following description, the incumbent user will be used as the licensed device.

When the incumbent user such as a microphone is already using the corresponding channel, the use of the corresponding channel should be stopped in order to protect the incumbent user. Namely, the 802.11 STA needs to first check whether or not the corresponding channel has been occupied by the incumbent user in the channel scanning process. In other words, a procedure of sensing the channel is required to check whether or not there is an incumbent user in the corresponding channel before the related art channel scanning procedure.

Figure 6:
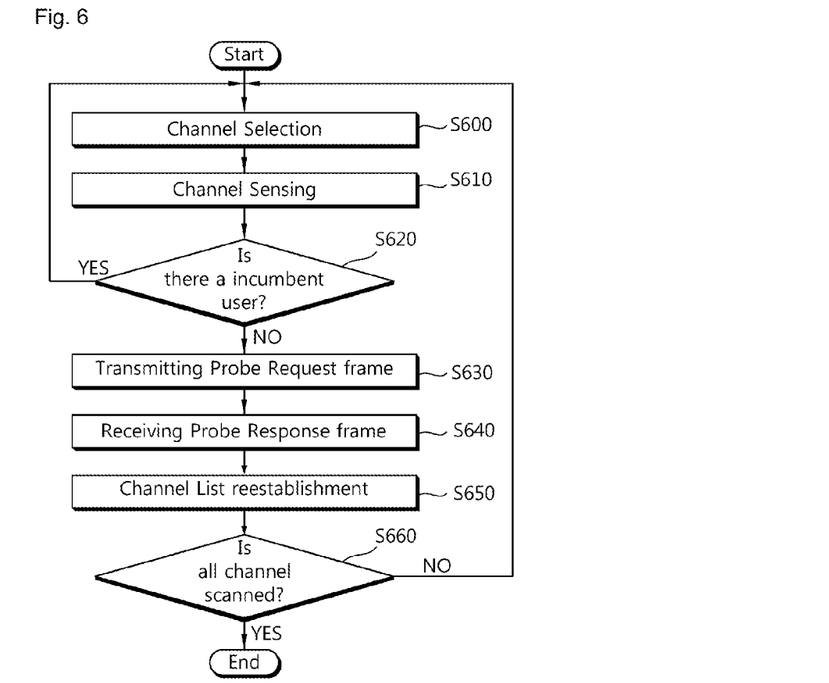
FIG. 6 is a flow chart illustrating the process of a channel scanning procedure according to an exemplary embodiment of the present invention.

FIG. 6 is a flow chart illustrating the process of a channel scanning procedure according to an exemplary embodiment of the present invention.

With reference to FIG. 6, the scanning STA selects a channel on the channel list (S600). Next, the scanning STA senses whether or not there is an incumbent user already occupying the selected channel (S620). In this case, an energy detection method, a signature detection method, or the like, may be used as the sensing mechanism. For example, if a signature of an incumbent user is detected in a corresponding frequency band according to the sensing result, it may be determined that there is an incumbent user in the corresponding frequency band.

If there is an incumbent user upon determination of the presence of incumbent user according to the sensing result (S620), the scanning STA cannot perform scanning in the corresponding channel, so it returns to step S600 to select another channel. If there is no incumbent user, the scanning STA perform a scanning procedure.

In this respect, regarding the TV white space frequency band of 512 MHz to 698 MHz, if a bandwidth of an incumbent user channel is 6 MHz, two or more incumbent user channels may exist, so sensing whether or not there are incumbent users in the individual incumbent user channels causes much overhead.

Thus, the present invention proposes a channel scanning method in which information about whether or not there is an incumbent user in an incumbent user channel is provided to the scanning STA to allow the scanning STA to omit the sensing procedure for an incumbent user channel known to have an incumbent user, thus solving a problem otherwise caused as every incumbent user channel is necessarily sensed.

Subsequently, with reference to FIG. 6, if there is no incumbent user in the incumbent user channel, the scanning STA broadcasts a probe request frame (S630). A responder operating in the corresponding channel transmits a probe response frame to the scanning STA (S640). In case of the infrastructure BSS, the WS AP may transmit the probe response frame to the scanning STA (Hereinafter, the case where the responder is the WS AP in case of the infrastructure BSS will be taken as an example for the sake of brevity, but it is obvious that the technical idea of the present invention is also applicable to the IBSS). In this case, the probe response frame may include white space channel information the WS AP knows about, as an information element. In the following description, unless otherwise specified, the channel refers to a WS channel and an information element regarding WS channel information will be referred to as a white space map (WSM).

The WSM includes information about whether each channel is occupied by an incumbent user or IEEE 802.11 user. The WSM may also include information of sensing time. The channel information that is included in the WSM and a WSM format will be explained in full later.

The WS AP may scan each channel or receive WSM from another WS AP or STA to update the WSM and keep the same. The WSM includes information regarding whether or not there is an incumbent user in each channel, or the like. Accordingly, upon receiving the probe response frame, the scanning STA recognizes whether or not there is an incumbent user in each channel through the WSM information element included in the probe response frame.

Thereafter, the scanning STA reconfigures (reestablishes) scanning target channels based on the WSM (S650). Namely, the scanning STA excludes a channel known to have an incumbent user from the scanning target. And then, the scanning STA determines whether there is a channel which has not been scanned yet based on the reconfigured channel list (S660). If there is no more channel which has not been scanned yet, the scanning STA terminates the channel scanning procedure, whereas if there is any channel which has not been scanned yet, the scanning STA returns to step S6600 to repeatedly perform the process on every channel which has not been scanned yet and known not to have an incumbent user.

According to a different exemplary embodiment, the WS STA may directly request the WSM from the WS AP. The WS AP also may directly request the WSM from the WS STA.

In this case, the WS STA transmits a WSM request frame requesting transmission of the WSM from the counterpart WS AP. Upon receiving the WSM request frame, the WS AP transmits a WSM response frame including a WSM information element to the WS STA.

The frame body of a management frame of the WSM request contains the information shown in Table 4 below:

TABLE 4

| order | Information |
|---|---|
| 1 | Category |
| 2 | Action |
| 3 | Dialog Token |

The frame body of a management frame of the WSM response contains the information shown in Table 5 below:

TABLE 5

| order | Information |
|---|---|
| 1 | Category |
| 2 | Action |
| 3 | Dialog Token |
| 4 | White Space Map(WSM) |

A WSM information element format will now be described in detail.

Figure 7:
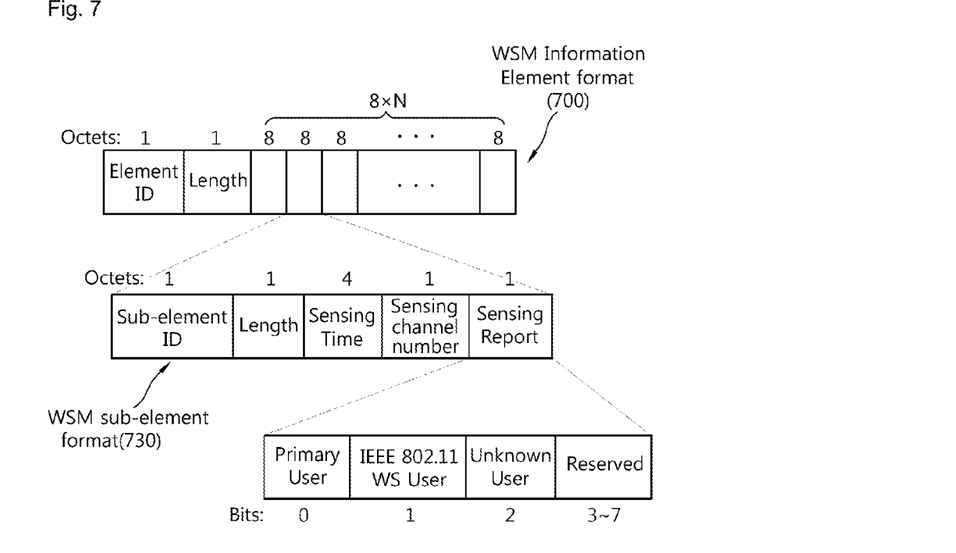
FIG. 7 illustrates an example of WSM.

FIG. 7 illustrates an example of WSM.

The WSM includes Element ID of identifying an element, Length informing about a length, and N number of WSM sub-elements. Here, N is the number of channels. Namely, each WSMA sub-element includes information of a single channel.

A WSM sub-element may include Sub-element ID, Length, Sensing Time, Sensing Channel Number, and Sensing Report. The Sensing Time includes information about a time period during which sensing has been performed, which may be also indicated as a TSF time. The Sensing Channel Number indicates a channel-number that has performed sensing. The Sensing Report indicates a sensing result with respect to a channel corresponding to the Sensing Channel Number.

The Sensing Report may have a length of 1 octet and include a Primary User bit, an IEEE 802.11 WS User bit, an Unknown User bit. The Primary User bit indicates whether or not there is an incumbent user in a corresponding channel. For example, if there is an incumbent user in a corresponding channel, the Primary User bit may be set to 1, whereas if there is no incumbent user in the corresponding channel, the Primary User bit may be set to 0. The IEEE 802.11 WS User bit indicates whether or not there is an IEEE 802.11 WS user. The Unknown User bit may be used to indicate an unknown user detected in the corresponding channel. The unknown user is a user whose type of radio access cannot be identified by an AP.

In a different exemplary embodiment of the present invention, a channel sensing result obtained by the scanning STA after performing channel sensing may be provided to the WS AP. In this case, the result of channel sensing lately directly performed by the scanning STA may be delivered to the WS AP to reduce channel sensing targets of the WS AP, or the WSM of the WS AP may be updated with the latest information. To this end, when the scanning STA transmits the probe request frame to the WS AP, it may include a WSM information element in the probe request frame and then transmits the probe request frame.

Figure 8:
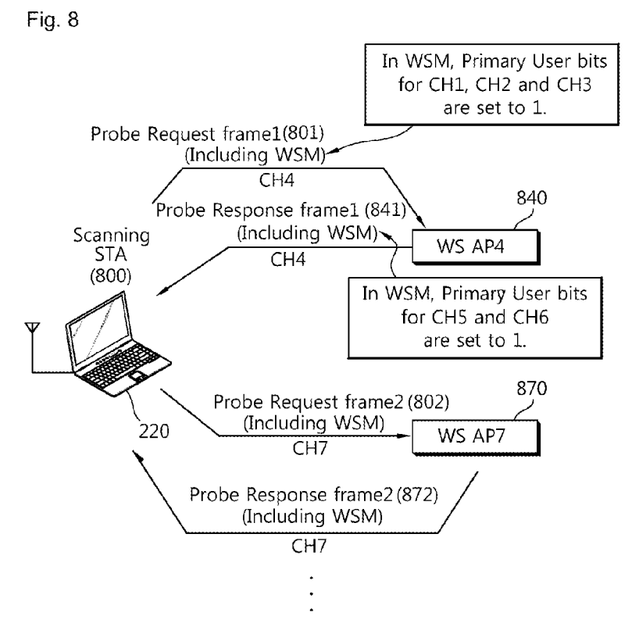
FIG. 8 illustrates a channel scanning method using a WSM according to an exemplary embodiment of the present invention.

FIG. 8 illustrates a channel scanning method using a WSM according to an exemplary embodiment of the present invention. It is assumed that incumbent users exist in a first channel CH1, a second channel CH2, a third channel CH3, a fifth channel CH5, and a sixth channel CH6, a WS AP4 840 exists in a fourth channel CH4, and a WS AP7 870 exists in a seventh channel CH7.

With reference to FIG. 8, a scanning STA 800 senses a channel in the CH1, CH2, and CH3. In this case, however, because there are incumbent users in the CH1, CH2, and CH3, the scanning STA 800 does not transmit a probe request frame.

Since there is no incumbent user in the channel CH4, the scanning STA 800 broadcasts a probe request frame1 801. In this case, the probe request frame 801 includes a WSM carrying the result (i.e., the information regarding the presence of incumbent users in the CH1, CH2, and CH3 of sensing previously performed by the scanning STA 800. Upon listening to the probe request frame1 801, the WS AP4 840 may update the WAM of the WS AP4 840 based on the WSM included in the probe request frame 801.

The WS AP4 840 transmits a probe response frame1 841 to the scanning STA in response to the probe request frame1 801. In this case, the probe response frame1 841 includes the WSM carrying channel information (i.e., information regarding the presence of incumbent users in the CH5 and CH6) the WS AP4 840 knows about. According to the format of an exemplary embodiment of the present invention, in this case, the Primary User bit of the Sensing Report with respect to the CH5 and CH6 is set to 1, which is then transmitted.

Upon receiving the probe response frame1 841, the scanning STA 800 knows about the presence of the incumbent users in the CH5 and CH6 from the WSM included in the probe response frame1 841, the scanning STA 800 immediately exchanges a probe request frame2 802 and a probe response frame2 872 with the WS AP7 870, without performing sensing on the CH5 and CH6. Thereafter, the scanning STA 800 performs scanning on the entirety of the following channels in the same manner as that of the process described above. Therefore, overhead that may be otherwise generated when all the channels are necessarily scanned can be reduced through the channel scanning method according to the exemplary embodiment of the present invention.

Figure 9:
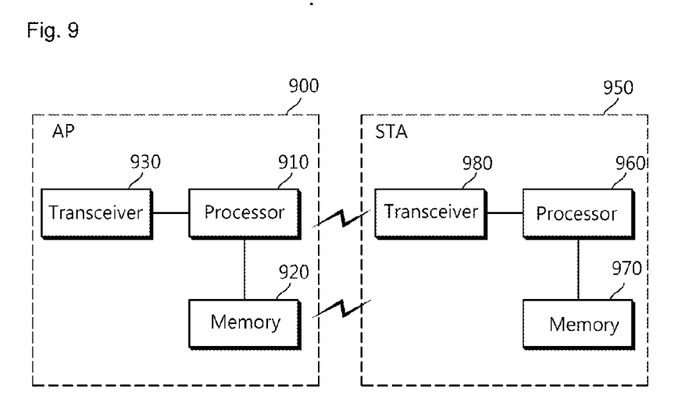
FIG. 9 is a schematic block diagram of wireless apparatuses implementing an exemplary embodiment of the present invention.

FIG. 9 is a schematic block diagram of a wireless apparatuses implementing an exemplary embodiment of the present invention. An AP 900 includes a processor 910, a memory 920, a transceiver 930, and a STA 950 includes a processor 960, a memory 970, and a transceiver 980. The transceivers 930 and 980 transmit/receive a radio signal and implement an IEEE 802 physical layer. The processors 910 and 960 are connected with the transceivers 930 and 960 to implement an IEEE 902 MAC layer. The processors 910 and 960 may implement the above-described channel scanning method.

The processors 910 and 960 and/or the transceivers 930 and 980 may include an application-specific integrated circuit (ASIC), a different chip set, a logical circuit, and/or a data processing unit. The memories 920 and 970 may include a read-only memory (ROM), a random access memory (RAM), a flash memory, a memory card, a storage medium, and/or any other storage units. When an exemplary embodiment is implemented by software, the above-described scheme may be implemented as a module (process, function, etc.) performing the above-described functions. The module may be stored in the memories 920 and 970 and executed by the processors 910 and 960. The memories 920 and 970 may be disposed within or outside the processors 910 and 960 and connected with the processors 910 and 960 via well-known means.

The invention claimed is:

1. A method of scanning channels for a whitespace zone in a wireless local area network, the method comprising:
    transmitting a request frame from a scanning station to a response station on an available channel identified in a first white space map (WSM) including a list of available channels;
    receiving a response frame as a response of the request frame from the response station, the response frame including a second WSM including an updated list of available channels;
    moving to a channel based on the second WSM; and
    scanning, by the scanning station, channels of the whitespace zone based on the second WSM,
    wherein the scanning includes transmitting another request frame from the scanning station on an available channel identified in the second WSM,
    wherein the response station acquires available channel information of the whitespace zone from an entity having the available channel information,
    wherein the response station generates at least one of the first WSM or the second WSM based on the acquired available channel information,
    wherein the request frame is a probe request frame,
    wherein the response frame is a probe response frame, and
    wherein the probe request frame and the probe response frame are used by the scanning station for scanning for Basic Service Sets (BSSs) operating on a channel on which the probe request frame is transmitted.

2. The method of claim 1, further comprising sensing channels of the whitespace zone by the scanning station before the transmission by the scanning station is started.

3. The method of claim 1, wherein, if the available channel in the whitespace zone with no incumbent user is found, the request frame is transmitted.

4. The method of claim 1, wherein the request frame includes a sensing result of the channels of the whitespace zone.

5. The method of claim 1, wherein the at least one of the first WSM or the second WSM includes a channel number field indicating an available TV channel.

6. The method of claim 1, wherein the second WSM is included in a frame body of the response frame.

7. The method of claim 1, wherein:
    the request frame is a management frame of the WSM request; and
    the response frame is a management frame of the WSM response.

8. The method of claim 1, wherein the scanning channels of the whitespace zone comprises:
    determining the available channel based on the second WSM; and
    scanning the determined available channel.

9. A wireless apparatus for scanning channels for a whitespace zone in a wireless local area network, the wireless apparatus comprising:
    a transceiver configured to:
        transmit a request frame from the wireless apparatus to a response station on an available channel identified in a first white space map (WSM) including a list of available channels; and receive a response frame as a response of the request frame from the response station, the response frame including a second WSM including an updated list of available channels; and a processor configured to:
- move to a channel based on the second WSM; and
- scan channels of the white space zone based on the second WSM, wherein the response station is configured to:
- acquire available channel information of the whitespace zone from an entity having the available channel information, and
- generate at least one of the first WSM or the second WSM based on the acquired available channel information, wherein the request frame is a probe request frame, wherein the response frame is a probe response frame, and wherein the probe request frame and the probe response frame are used by the scanning station for scanning for Basic Service Sets (BSSs) operating on a channel on which the probe request frame is transmitted.

* * * * *